(12) United States Patent
Kimura

(10) Patent No.: US 7,330,968 B2
(45) Date of Patent: Feb. 12, 2008

(54) COMMUNICATION NETWORK SYSTEM HAVING SECRET CONCEALMENT FUNCTION, AND COMMUNICATION METHOD

(75) Inventor: Misao Kimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 833 days.

(21) Appl. No.: 10/053,421

(22) Filed: Jan. 16, 2002

(65) Prior Publication Data

US 2003/0061479 A1    Mar. 27, 2003

(30) Foreign Application Priority Data

Sep. 21, 2001    (JP) .............................. 2001-288076

(51) Int. Cl.
*H04L 9/00*    (2006.01)

(52) U.S. Cl. ..................................................... 713/153

(58) Field of Classification Search ................. 713/153
See application file for complete search history.

(56) References Cited

U.S. PATENT DOCUMENTS

| 5,509,077 | A | * | 4/1996 | Moehrmann | ................. | 380/30 |
| 5,511,122 | A | * | 4/1996 | Atkinson | ..................... | 713/153 |
| 5,661,803 | A | * | 8/1997 | Cordery et al. | ............... | 705/60 |
| 5,740,230 | A | * | 4/1998 | Vaudreuil | ................ | 379/88.22 |
| 6,041,123 | A | * | 3/2000 | Colvin, Sr. | ................. | 713/153 |
| 6,049,878 | A | * | 4/2000 | Caronni et al. | ................ | 726/3 |
| 6,061,791 | A | * | 5/2000 | Moreau | ...................... | 713/171 |
| 6,061,796 | A | * | 5/2000 | Chen et al. | ................... | 726/15 |
| 6,073,242 | A | * | 6/2000 | Hardy et al. | .................... | 726/1 |
| 6,084,969 | A | * | 7/2000 | Wright et al. | ............... | 380/271 |
| 6,158,011 | A | * | 12/2000 | Chen et al. | ................... | 726/15 |
| 6,195,751 | B1 | * | 2/2001 | Caronni et al. | ............. | 713/163 |
| 6,275,588 | B1 | * | 8/2001 | Videcrantz et al. | ......... | 380/255 |
| 6,363,154 | B1 | * | 3/2002 | Peyravian et al. | .......... | 380/283 |

(Continued)

FOREIGN PATENT DOCUMENTS

JP    10-322328    12/1998

(Continued)

OTHER PUBLICATIONS

Network Associates Inc., "PGP Documentation version 6.5", 1999, See Citations Listing.*

(Continued)

*Primary Examiner*—Nasser Moazzami
*Assistant Examiner*—David Garcia Cervetti
(74) *Attorney, Agent, or Firm*—Katten Muchin Rosenman LLP

(57) ABSTRACT

The present invention provides a communication network system having a central management device and a plurality of local area network systems. Each of the plurality of local area network systems has a router and a terminal. The central management device encrypts a common key by using each public key of each router, and sends the encrypted common key to each router. The router decrypts the encrypted common key sent from the central management device by using a secret key of the router. The router encrypts communication data to be sent from a terminal in the router's local area network system to a terminal in another local area network system, or to be sent from the router to the central management device by using the common key, and sends the encrypted communication data to another local area network or the central management device.

15 Claims, 9 Drawing Sheets

U.S. PATENT DOCUMENTS

| | | | |
|---|---|---|---|
| 6,421,779 B1 * | 7/2002 | Kuroda et al. | 713/169 |
| 6,662,299 B1 * | 12/2003 | Price, III | 713/171 |
| 6,725,276 B1 * | 4/2004 | Hardjono et al. | 709/238 |
| 6,738,900 B1 * | 5/2004 | Hardjono et al. | 713/156 |
| 6,754,349 B1 * | 6/2004 | Arthan | 380/286 |
| 6,895,501 B1 * | 5/2005 | Salowey | 713/168 |
| 6,978,364 B1 * | 12/2005 | Balaz et al. | 713/153 |
| 7,035,202 B2 * | 4/2006 | Callon | 370/216 |
| 7,095,857 B2 * | 8/2006 | Ishii | 380/278 |
| 2002/0131362 A1 * | 9/2002 | Callon | 370/216 |
| 2002/0131602 A1 * | 9/2002 | Ishii | 380/278 |
| 2002/0147820 A1 * | 10/2002 | Yokote | 709/229 |
| 2002/0152373 A1 * | 10/2002 | Sun et al. | 713/150 |
| 2003/0021416 A1 * | 1/2003 | Brown et al. | 380/277 |
| 2003/0126468 A1 * | 7/2003 | Markham | 713/201 |
| 2004/0168184 A1 * | 8/2004 | Steenkamp et al. | 725/31 |
| 2005/0021467 A1 * | 1/2005 | Franzdonk | 705/51 |

FOREIGN PATENT DOCUMENTS

| | | |
|---|---|---|
| JP | 11-085014 | 3/1999 |
| JP | 11-196081 | 7/1999 |

OTHER PUBLICATIONS

PGP Corporation, "PGP History", Most recent update 2005, www.pgp.com/company/history.html.*

* cited by examiner

FIG. 2

SECRET CONCEALMENT TERMINAL TABLE

| ROUTERS | SUBSCRIBER TERMINALS | PARTNER TERMINALS |
|---|---|---|
| ROUTER $5_1$ | TERMINAL $6_{11}$ | TERMINAL $6_{21}$ |
| | TERMINAL $6_{11}$ | TERMINAL $6_{25}$ |
| | ⋮ | ⋮ |
| | TERMINAL $6_{12}$ | TERMINAL $6_{32}$ |
| | TERMINAL $6_{12}$ | TERMINAL $6_{44}$ |
| | ⋮ | ⋮ |
| | TERMINAL $6_{1p}$ | TERMINAL $6_{22}$ |
| | ⋮ | ⋮ |
| ROUTER $5_2$ | ⋮ | ⋮ |
| ⋮ | ⋮ | ⋮ |
| ROUTER $5_n$ | ⋮ | ⋮ |

FIG. 3A

PUBLIC KEY/SECRET KEY TABLE

| ROUTERS | PUBLIC KEYS | SECRET KEYS |
|---|---|---|
| CENTRAL MANAGEMENT DEVICE | Kpc | Ksc |
| ROUTER $5_1$ | Kp1 | Ks1 |
| ROUTER $5_2$ | Kp2 | Ks2 |
| ⋮ | ⋮ | ⋮ |
| ROUTER $5_n$ | Kpn | Ksn |

FIG. 3B

PUBLIC KEY/SECRET KEY TABLE

| ROUTERS | PARTNER ROUTER | PUBLIC KEYS | SECRET KEYS |
|---|---|---|---|
| CENTRAL MANAGEMENT DEVICE | ROUTER $5_1$ | Kpc1 | Ksc1 |
| | ROUTER $5_2$ | Kpc2 | Ksc2 |
| | ⋮ | ⋮ | ⋮ |
| | ROUTER $5_n$ | Kpcn | Kscn |
| ROUTER $5_1$ | CENTRAL MANAGEMENT DEVICE | Kp1c | Ks1c |
| | ROUTER $5_2$ | Kp12 | Ks12 |
| | ⋮ | ⋮ | ⋮ |
| | ROUTER $5_n$ | Kp1n | Ks1n |
| ⋮ | ⋮ | ⋮ | ⋮ |

FIG. 4A

COMMON KEY TABLE

| COMMON KEYS |
|---|
| Kc1 |
| Kc2 |
| ⋮ |

FIG. 4B

COMMON KEY TABLE

| COMMON KEYS | ENCRYPTION METHOD |
|---|---|
| Kc1 | M1 |
| Kc2 | M2 |
| ⋮ | ⋮ |

FIG. 5A

SECRET CONCEALMENT TERMINAL TABLE

| SUBSCRIBER TERMINALS | PARTNER TERMINALS |
|---|---|
| TERMINAL $6_{11}$ | TERMINAL $6_{21}$ |
| TERMINAL $6_{11}$ | TERMINAL $6_{25}$ |
| ⋮ | ⋮ |
| TERMINAL $6_{12}$ | TERMINAL $6_{32}$ |
| TERMINAL $6_{12}$ | TERMINAL $6_{44}$ |
| ⋮ | ⋮ |
| TERMINAL $6_{1p}$ | TERMINAL $6_{22}$ |
| ⋮ | ⋮ |

FIG. 5B

PUBLIC KEY/SECRET KEY TABLE

| ROUTERS | PUBLIC KEYS | SECRET KEYS |
|---|---|---|
| ROUTER $5_1$ | Kp1 | Ks1 |
| ROUTER $5_2$ | Kp2 | |
| ⋮ | ⋮ | ⋮ |
| ROUTER $5_n$ | Kpn | |
| CENTRAL MANAGEMENT DEVICE | Kpc | |

FIG. 5C

COMMON KEY TABLE

| COMMON KEYS |
|---|
| Kc1 |
| Kc2 |
| ⋮ |

COMMUNICATION NETWORK SYSTEM HAVING SECRET CONCEALMENT FUNCTION, AND COMMUNICATION METHOD

BACKGROUND OF THE INVENTION

1. Field of the Invention

The present invention relates generally to a communication network system having a function to secretly conceal communication data, and to a communication method. More particularly, the invention relates to a communication network system that secretly conceals the data to be communicated between a plurality of local area networks that are mutually connected, and to a communication method.

Moreover, the present invention relates to a router having a function to secretly conceal communication data. In addition, the invention relates to a central management device that centrally manages information required for secret concealment of communication data.

2. Description of the Related Arts

Increasing number of corporations are building up a local area network (LAN) or the Intranet, routing a communication cable, like the Ethernet cable (for instance, 10BASE-T, etc.) within a single structure (building, factory, etc.), and to the cable, connecting a terminal (client) or server within the structure.

Also, even in the case of a single corporation, if its head office, branch office, factory and the like are located in different places of different structures, such a corporation builds up an intra-company network, mutually connecting local area networks built-up in each structure by another communication line. As the communication line that mutually connects the individual local area networks, a leased line supplied by a communication service company (for instance, part of the public network supplied by a communication service company) is generally used.

Unlike an open and public network like the Internet, such an intra-company network may be called a private network, since it is a personal network of a corporation.

On such a private network, confidential information to outsiders, in short, confidential information to outside of the company (for instance, secret information, intra-office information, etc.) may be communicated. Needless to say, such secret information should not be read, copied or tampered by any outsiders.

However, as the leased line that making up a part of the private network is to connect a structure-to-structure, the line is to be laid around the outside of the structure. Therefore, the portion of such a leased line can allow outsiders (for instance, unauthorized third party) to tapping or alter secret information more easily, compared with the portion of the local area network laid in the structure.

Because of this, in order to keep secret information from such a tapping or alteration, a variety of encryption technologies have been developed and even supplied to private networks.

However, the conventional encryption function is integrated into software like a mailer or a browser mounted on the terminal (client) of a private network. And whether the information is to be encrypted or not is entrusted to the awareness of the user using it. Therefore, the actual state is that the encryption of information is not performed if each user does not have high awareness to secret concealment of information.

In addition, a degree of importance of information, especially, whether the information is subject to secret concealment or not, differs depending on each user, and, for instance, even if the information is considered by the receiver or the third party to be subject to secret concealment, in the case where the sender is not aware of the necessity of secret concealment, the information will be sent without being encrypted.

Moreover, most users tend to recognize the private network as a closed network within the corporation, despite that the private network has a portion that uses a communication line installed to the outside of the structure (for instance, the leased line). Because of this, most users are not fully aware of risks of tapping or alteration by the third party.

From the background as described above, the need is increasing to systematically support encrypting information on a private network, not entrusting the task with individual users.

Also, it is troublesome for each user to manage an encryption key/decryption key. For instance, on a public key encryption system (method), the sender is required to manage different public keys for every destination (receiver). Moreover, when the system is extended, such as when a new terminal, server or local area network is additionally installed to the network, the sender will be additionally required to manage new public keys for those newly installed terminal, etc. As described, the sender is required complex management of such public keys.

SUMMARY OF THE INVENTION

The present invention was conceived in the light of the background as described above, and the object thereof is to secretly conceal communication data to be communicated between the local area networks on the communication network system on which a plurality of local network systems are mutually connected.

It is another object of the present invention to achieve a centralized management of information required for secret concealment of communication data.

A communication network system according to a first aspect of the present invention is a communication network system having a central management device and a plurality of local area network systems, said central management device and said plurality of local area network systems being connected to each other, each of the plurality of local area network systems having a router and a terminal which are connected to each other via a local area network, said central management device comprising: a management database for storing at least one common key, each public key assigned to each router and a public key assigned to the central management device; and a central-side encryption unit for encrypting the common key by using each public key assigned to each router, and sending the encrypted common key to each router; said router comprising: a first router-side decryption unit for decrypting the encrypted common key sent from said center-side encryption unit by using a secret key of the router; a storage unit for storing the common key after decryption by said first router-side decryption unit; and a router-side encryption unit for encrypting communication data to be sent from a first source terminal in a local area network system of the router to a first destination terminal in another local area network system, or communication data to be sent from the router to the central management device, by using the common key stored in said storage unit, and sending the encrypted communication data to another local area network or the central management device.

A communication method according to a first aspect of the present invention is a communication method in a communication network system having a central management device and a plurality of local area network systems, said central management device and said plurality of local area network systems being connected to each other, each of the plurality of local area network systems having a router and a terminal which are connected to each other via a local area network, comprising steps of: in said central management device, encrypting at least one common key stored in a management database in advance by using each public key assigned to each router, each public key being stored in said management database in advance; and sending the encrypted common key to each router; and in said router, decrypting the encrypted common key sent from the central management device by using a secret key of the router; encrypting communication data to be sent from a source terminal in a local area network system of the router to a destination terminal in another local area network system, or communication data to be sent from the router to the central management device by using the common key; and sending the encrypted communication data to another local area network or the central management device.

According to the first aspect of the present invention, the communication data to be communicated between local area networks is encrypted by the router. Accordingly, the data to be communicated over local area network system-to-system can be secretly concealed, even if the user of the terminal of the local area network system is not aware of the secret concealment of the data (encryption). By this function, the data will be secretly concealed on a communication line connecting the local area network system-to-system, thereby preventing any tapping, copying, and alteration by the third party at the communication line.

Moreover, the common key to be used in encryption is sent to each router so that each router can use it, once stored on the management database of the central management device. Accordingly, the central management device can make the centralized management of the common key.

Preferably, said router further comprises: a second router-side decryption unit for decrypting data sent from a second source terminal in another local area network system to a second destination terminal in the local area network system of the router, and sending the data after decryption to said second destination terminal.

Here, the second source terminal and the first destination terminal may be the same terminal or different terminals. Further, the second destination terminal and the first source terminal may be the same terminal or different terminals.

A router according to a second aspect of the present invention is a router disposed in each of a plurality of local area network systems which are connected to a central management device, the router being connected via a local area network to a terminal disposed in each of the plurality of local area network systems, the router comprising: a decryption unit for decrypting an encrypted common key sent from said central management device, by using a secret key for said router, said common key being encrypted by using a public key for the router; a storage unit for storing said common key after decryption by said decryption unit; and an encryption unit for encrypting communication data to be sent from a source terminal in a local area network system of said router to a destination terminal in another local area network system, or communication data to be sent from said router to the central management device, by using the common key stored in said storage unit, and sending the encrypted communication data to another local area network or the central management device.

A communication method according to a second aspect of the present invention is a communication method of a router in each of a plurality of local area network systems which are connected to a central management device, said router being connected to a terminal via a local area network, comprising steps of: decrypting an encrypted common key sent from said central management device by using a secret key for said router, said common key being encrypted by using a public key for said router; storing the common key after decryption in a storage unit in the router; encrypting communication data to be sent from a source terminal in a local area network system of the router to a destination terminal in another local area network system, or communication data to be sent from the router to the central management device, by using the common key stored in the storage unit; and sending the encrypted communication data to another local area network or to the central management device.

A program product according to a second aspect of the present invention is a program product executed by a router disposed in each of a plurality of local area network systems which are connected to a central management device, the router being connected via a local area network to a terminal disposed in each of the plurality of local area network systems, said program product comprising steps of: decrypting an encrypted common key sent from the central management device by using a secret key of the router, said common key being encrypted by using a public key of the router; storing said common key after decryption in a storage unit of the router; encrypting communication data to be sent from a source terminal in a local area network system of the router to a destination terminal in another local area network system, or communication data to be sent from the router to the central management device, by using the common key stored in the storage unit; and sending the encrypted communication data to another local area network or to the central management device.

According to the second aspect of the present invention as well, the same operation and effect can be obtained as those obtained by the first aspect.

A central management device according to a third aspect of the present invention is a central management device connected to a plurality of local area network systems each having a router and a terminal which are connected to each other through a local area network, the central management device comprising: a management database for storing at least one common key, each public key assigned to each router and a public key assigned to said central management device, said at least one common key being used by each router to encrypt communication data to be communicated between a terminal of a local area network system and a terminal of another local area network system, or between each router and the central management device; and an encryption unit for encrypting the common key by using each public key assigned to each router, and sending the encrypted common key to each router.

A management method according to a third aspect of the present invention is a management method of a central management device connected to a plurality of local area network systems each having a router and a terminal which are connected to each other through a local area network, the management method comprising steps of: storing in a management database and managing at least one common key, each public key assigned to each router and a public key assigned to said central management device, said at least one common key being used by each router to encrypt communication data to be communicated between a terminal in a local area network system and a terminal in another local area network system, or between a router and the central management device; encrypting the common key by using each public key assigned to each router; and sending the encrypted common key to each router.

A program product according to a third aspect of the present invention is a program product executed by a computer installed in a central management device connected to a plurality of local area network system each having a router and a terminal which are connected to each other through a local area network, said program product comprising steps of: storing in a management database and managing at least one common key, each public key assigned to each router and a public key assigned to said central management device, said at least one common key being used by each router to encrypt communication data to be communicated between a terminal in a local area network system and a terminal in another local area network system, or between a router and the central management device; and encrypting the common key by using each public key assigned to each router; and sending the encrypted common key to each router.

According to the third aspect of the present invention, the central management device can centrally manage the common key used for encryption of the communication data to be communicated between local area network systems.

BRIEF DESCRIPTION OF THE DRAWINGS

FIGS. 2,3A, 3B, 4A, and 4B show the data held by the management database;

FIGS. 5A to 5C shows the data held by the router $5_1$;

DESCRIPTION OF THE PREFERRED EMBODIMENTS

Embodiments of the present invention will now be described. It is to be understood that the embodiments are given by way of example and are not intended to restrict the technical scope of the present invention.

Figure 1:
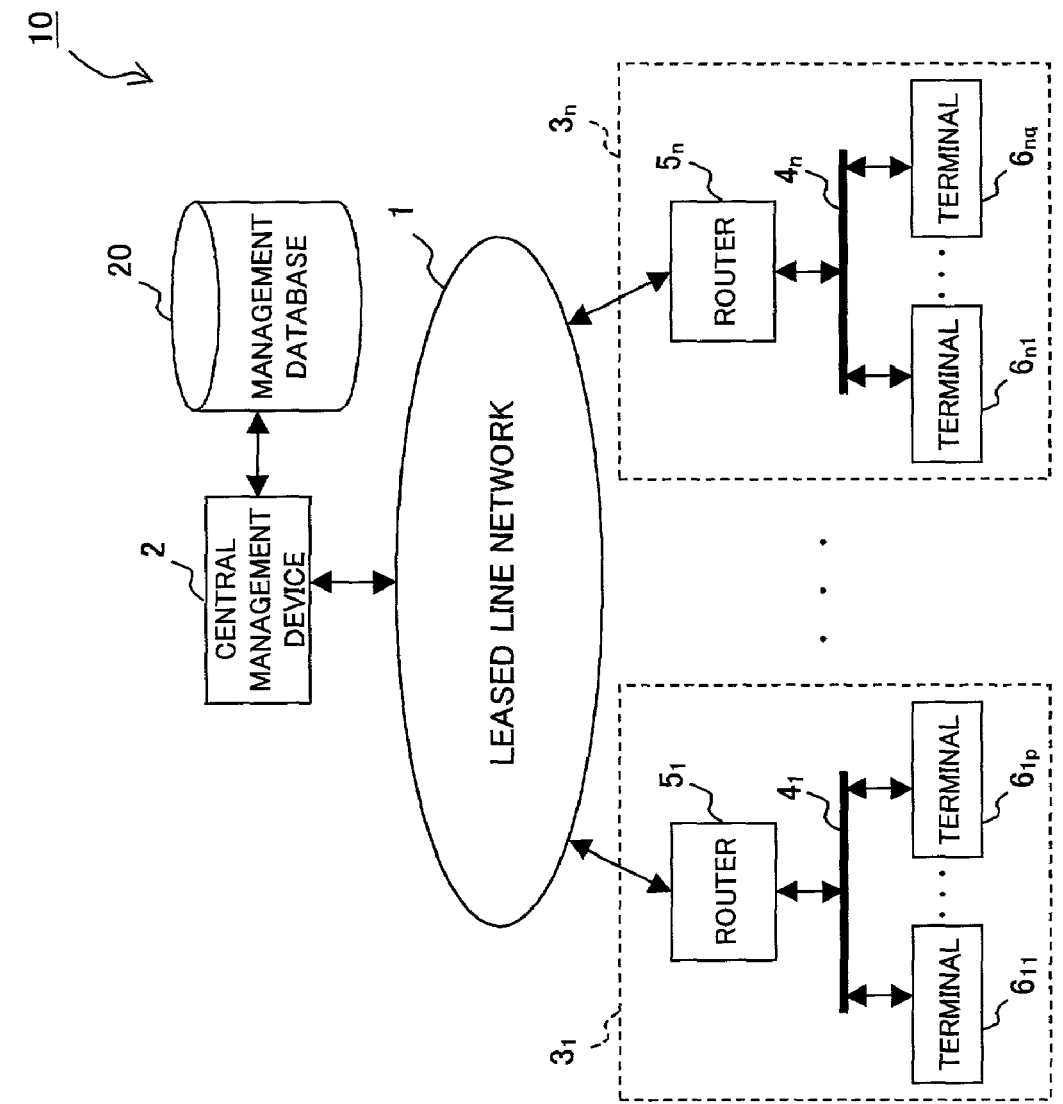
FIG. 1 is a block diagram showing the overall configuration of a communication network system according to an embodiment of the present invention.

FIG. 1 is a block diagram showing the overall configuration of a communication network system 10 according to an embodiment of the present invention. This communication network system 10 is a private network system of a corporation (Company A). The communication network system has a leased line network 1, a central management device 2, and a plurality (n:n denotes any integer of 2 or more) of local area network systems 3. through $3_n$.

The leased line network 1 is a communication network having a leased line supplied by a communication service company. To this leased line, part of the public network may be allocated.

The individual local area network systems 3. through 3n are, for instance, intranets, each of which is installed to the premises of the head office, factory, and business office of Company A. Each of the local area network systems 3. through $3_n$, has local area networks or private networks (for instance, LANs of Ethernet) 4. through $4_n$, routers 5. through 5n, and one or more terminals $6_{11}$, through $6_{1p}$ . . . $6_{n1}$ through $6_{nq}$ (p and q are any integer more than 1).

Hereinafter, the individual local area network systems 3. through 3n are to be generically named "local area network system 3", except the case where special identification of the specific system is necessary in using it. In the same manner, the private networks 4. through 4n are to be generically named "local area network 4", and the routers 5. through $5_n$, are to be generically named "router 5", and the terminals $6_{11}$ through $6_{1p}$ . . . $6_{n1}$ through $6_{nq}$ are to be generically named "terminal 6", except the case where special identification is needed in use.

Each of the router 5 and the central management device 2 are connected to the leased line network 1, so that they can mutually communicate through the leased line network 1. Moreover, the router 5 and the terminal 6 installed at the individual local area network systems 3 are connected to the local area network 4, so that they can mutually communicate through the local area network 4. In this embodiment, the data (message) to be communicated through the leased line network 1 and the local area network 4 is transmitted using the IP packet. The terminal 6 means, for instance, a personal computers, work stations, etc. to be used by the managers or employees of Company A, and sometimes may be called "client".

In some cases, a firewall may be connected to the leased line network 1, instead of the router 5. In such cases, the router 5 is connected to the firewall, and further connected to the leased line network 1 through the firewall.

Like the router 5, the central management device 2 is also installed at the premises of a certain corporation, and this device may be installed to the local area network system (whichever system of the local network systems 3. through $3_n$ or a different local area network system). The router or the firewall can make up the central management device 2.

To the central management device 2, a management database 20, which will be detailed later, is installed. As detailed later, the management database 20 has the information concerning whether encryption of the data to be communicated between the individual terminal 6 (IP packet) being necessary or not, and the information concerning the key for encryption, and this database centrally manages the information on the communication network system 10. Portion of the information contained in the management database 20 is given to each router 5, and to be used in encrypting/decrypting the data to be communicated between the terminal 6.

In the case, where the terminal 6 (source terminal) in a certain local area network system 3 is to transmit data to the terminal 6 (destination terminal) in another local area network system 3, the data is transmitted to the leased line network 1, through the router 5 (source router) installed at the local area network system 3 of the source terminal, and from the leased line network 1, the data is further transmitted via the router 5 (destination router) of the local area network system 3 having the destination terminal.

At this time, in this embodiment, the source router judges whether encryption of data to be transmitted is necessary or not. This judgment is made based on the information given from the management database 20. If encryption is needed, the source router encrypts the data and sends to the destination router.

On the other hand, the destination router judges whether decryption of the data sent from the source router is needed or not. This judgment is also made based on the information given from the management database 20. If decryption is needed, the destination router decrypts the data and sends the decrypted data to the destination terminal installed to the same local area network system.

As described above, in this embodiment, the messages to be communicated over the different local area network systems 3 are encrypted and decrypted by the router 5. By this function, any illegal tapping, copying or altering of the data to be communicated over the local area network systems 3 by the third party can be effectively prevented. Also, as the router judges the necessity of encrypting/decrypting the data, and it encrypts/decrypts the data if necessary, secret concealment of information can be made securely.

For information, as to the message to be communicated within the same local area network system 3, like the conventional system, encryption/decryption is made by the encryption function installed at the mailer or browser for the individual terminal 6.

The following shows details of the information held by the management database 20, detailed configuration of the router 5, and detailed description about encryption/decryption process.

FIGS. 2, 3A, 3B, 4A, and 4B show the data held by the management database 20. The management database 20 has the data concerning a secret concealment terminal table (FIG. 2), a public key/secret key table (FIGS. 3A and 3B), and a common key table (FIGS. 4A and 4B). The manager of the communication network system 10, or the operator of the central management device 2 operating the central management device 2 may input these data in the management database 20.

In FIG. 2, the secret concealment terminal table has the field for the routers, the field for the subscriber terminals (source/destination terminals), and the field of the partner terminals (destination/source terminals), and this drawing shows the combination of the two terminals (in short, the subscriber terminal and the partner terminal shown in FIG. 2), between which the data that needs secret concealment (in other words, encryption (and decryption)), out of the communication data exchanged between the terminal 6 is to be sent or received. In other words, when data is communicated between the subscriber terminal and the partner terminal as given on this secret concealment terminal table, the data is encrypted/decrypted.

The field for the routers has the identification information to identify each router 5 on the communication network system 10. As the identification information, for example, the IP address of the router 5 is used. However, since this identification information may be any information that can identify each router 5 at the communication network system 10, portion of the IP address or the name of each router 5 can be used as this identification information.

The field for the subscription terminals has the identification information to identify the terminal 6 subscribed in the router 5 provided under the router field (in other words, the terminal directly connected to the router 5 through the local area network 4). For example, the terminals $6_{11}$, $6_{12}$, $6_{1p}$, etc. subscribed in the router $5_1$, and are directly connected to the router $5_1$ through the local area network $4_1$.

The field for the partner terminals has the identification information for the terminal of the communicating partner, where communication to be exchanged needs secret concealment, when data is exchanged with the terminal 6 provided under the subscription terminal field. For example, the data to be communicated between the subscription terminal $6_{11}$ and its partner terminal $6_{21}$ or $6_{25}$ must be secretly concealed (in other words, encrypted and decrypted).

There may be a case where the subscription terminal becomes the source terminal, and the partner terminal becomes the destination terminal, and the reverse case may exist. In whichever case, the data to be communicated is secretly concealed.

As the identification information to be stored in the fields of the subscription terminals and the partner terminals, for example, the IP address of the terminal 6 is used. However, like the field of the routers, this identification information may be any information that can identify the individual terminal 6 on the communication network system 10, portion of the IP address or the name of the individual terminal 6 can be used.

For information, as the secret concealment terminal table is used for discriminating between the data that needs secret concealment and the data that does not need secret concealment, if the data to be communicated throughout all the terminals 6 needs secret concealment, this secret concealment terminal table is not required to be installed to the management database 20.

As referred to FIG. 3A, the public key/secret key table shows the data concerning the combination of the public key and the secret key of the central management device 2, as well as the combination of the public key and the secret key of each routers 5.

Under the field for the routers, data and the identification information of the destination router (the router 5 or the central management device 2) of the common key used for encrypting the data are provided. Under the field for the public keys, the public key for encrypting the common key for encrypting or decrypting the data to be sent to the destination router provided under the field for the routers is provided. Under the field for the secret keys, the common key, which the destination router uses for decrypting the common key, is provided.

For example, the common key used for encrypting the data to be sent from a certain router to the central management device 2 is encrypted by the public key Kpc of the central management device 2, and is sent to the central management device 2. The central management device 2 decrypts the common key encrypted by the secret key Ksc. Similarly, the common key used for encrypting the data to be sent from the router 5 except the router $5_1$, or from the central management device 2 to the router $5_1$ is encrypted by the public key Kp1 of the router $5_1$ and sent to the router $5_1$. The router $5_1$ decrypts the encrypted common key by the secret key Ks1. As to the public keys and secret keys of other routers, the functional procedure is the same as described above.

As shown in FIG. 3B, the combination of the public key/secret key can be individually provided for every partner router (in short, source router (the router 5 or the central management device 2)). For example, when the router $5_1$ is to send data to the central management device 2, the router $5_1$ encrypts the common key by the public key Kpc1 corresponding to the partner router $5_1$, and the central management device 2 decrypts the common key by the secret key Ksc1 corresponding to the partner router $5_1$. As to the public key and the secret key of other routers, the functional procedure is the same as described above.

As referred to FIG. 4A, the common key table has a plurality of common keys. Each router 5 and the central management device 2 optionally selects one key from the plurality of common keys, and encrypt the message. The selection method is entrusted to each router 5 and the central management device 2.

As shown in FIG. 4B, on the common key table, a common key encryption method (common key encryption system) corresponding to each common key can be provided, in addition to the field for common keys. For example, for the common key Kc1, the encryption method M1 is used, and for the common key Kc2, the encryption method M2 is used. The encryption method corresponding to each common key can be the same as the encryption method corresponding to other common keys, or can be different methods. In the common key encryption methods, there are DES (Data Encryption Standard), AES (Advanced Encryption Standard), etc.

Part of the data (table) stored in the management database 20 is sent from the central management device 2 to each router 5 through the leased line network 1, and is stored in internal memory (semiconductor memory, hard disk, etc.) for each router 5. This communication is performed adding to the data to be sent after being encrypted by one of the common keys (see FIG. 4A or 4B) stored in the management database 20, with the common key encrypted by the public key of the destination router 5. The router 5 on the receiver side decrypts the encrypted common key with its own secret key, and decrypts the encrypted data with the decrypted common key. The processing to send or receive data is same as the processing shown on the flowcharts in FIG. 8 and FIG. 9.

FIGS. 5A to 5C, as taking the case of the router $5_1$ out of the router 5, shows the data held by the router $5_1$. FIG. 5A shows the secret concealment terminal table, FIG. 5B shows the public key/secret key table, and FIG. 5C shows the common key table.

While referred to FIG. 5A, the secret concealment terminal table held by the router $5_1$ has only portion of the field for the routers that concerns the router $5_1$, out of the secret concealment terminal table (see FIG. 2.) held by the management database 20. In other words, the secret concealment terminal table held by the router $5_1$ has only the portion of the correspondence chart of the subscription terminal and its partner terminal of the router $5_1$.

While referred to FIG. 5B, the public key/secret key table held by the router $5_1$ only holds the public key and secret key of its own (in short the router $5_1$), out of the public key/secret key table (see FIG. 3A.) held by the management database 20, and also holds only the public keys of other routers 5 and the central management device 2. In the case where the public key/secret key table is as shown in FIG. 3B, the public key/secret key table held by the router $5_1$ can also be provided for every partner router, like the case as described above.

As referred to FIG. 5C, the common key table held by the router $5_1$ is the same as the table held by the management database 20 (see FIG. 4A or 4B).

The tables held by other routers $5_2$ through $5_n$ are the same as the table held by the router $5_1$.

In addition to these tables, each router 5 have, needless to say, the data that general routers held, like a routing table for controlling routes, etc., since they are routers.

Figure 6:
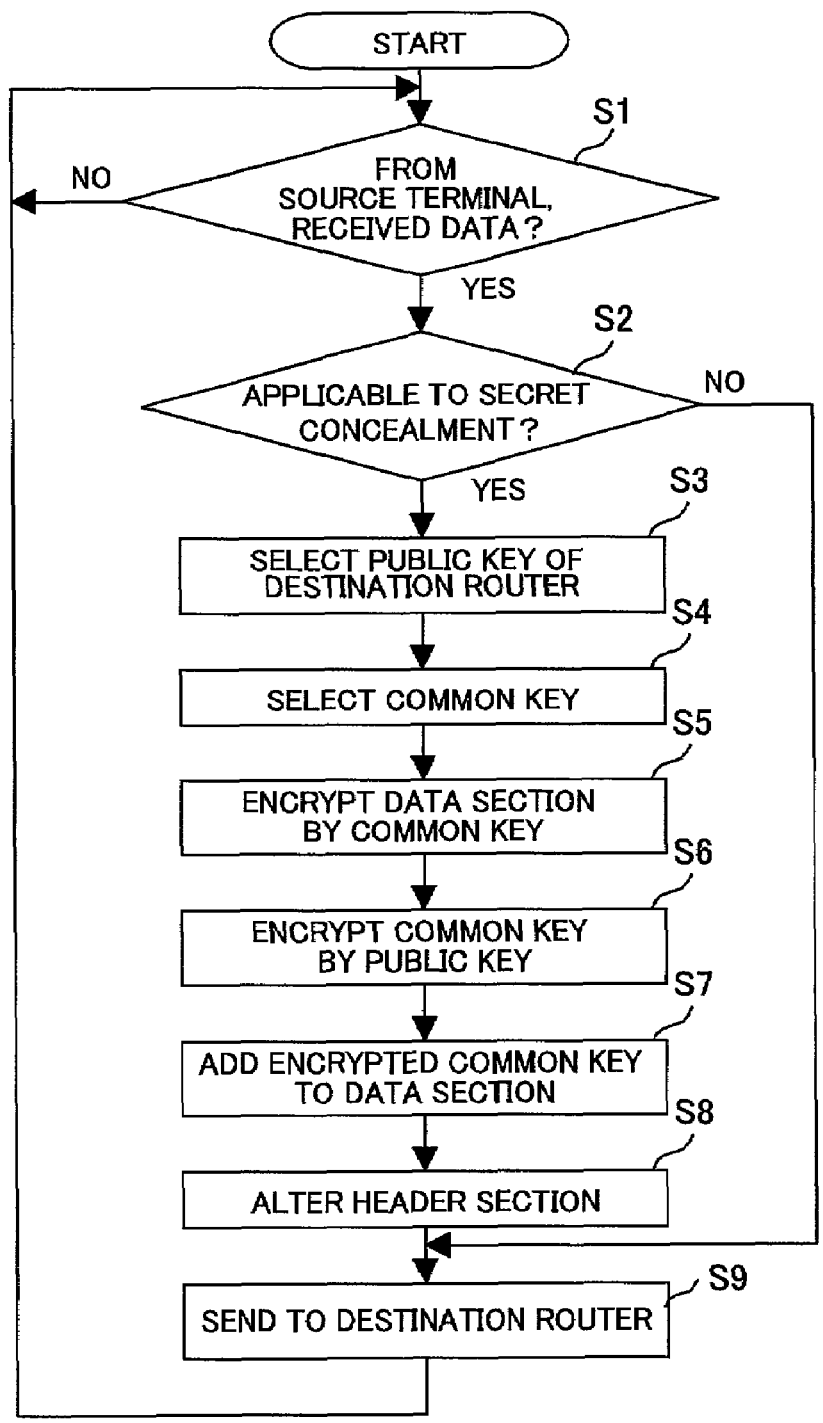
FIG. 6 is a flowchart showing the flow of processing when the source router that received the data from the subscription terminal is to send the data to the subscription terminal 6 of the destination router.

Each of the routers 5 encrypts and decrypts the communication data, based on such tables as described above, and performs routing of the encrypted data and distribute the data to the subscription terminals. FIG. 6 is a flowchart showing the flow of processing when the source router that received the data from the subscription terminal 6 (source terminal) is to send the data to the subscription terminal 6 (destination terminal) of the destination router.

When a source router receives data (IP packet) from a source terminal which is directly connected to itself, through the local area network 4 (YES at the step S1), the source router judges whether the message is subject to secret concealment (encryption) or not (Step S2).

This judgment is made based on the comparison of the IP address of the source terminal and the IP address of the destination terminal contained in the header portion of the data, with the secret concealment terminal table (see FIG. 5A) stored in itself. If there is the combination of the IP address of the source terminal and the IP address of the destination terminal on the secret concealment terminal table, the data is judged as being subject to secret concealment, but, if there is not, the data is judged as not being subject to secret concealment.

When the data is judged as being subject to secret concealment (YES at the step S2), the source router specifies the destination router, based on the routing table, and selects the public key of the specified destination router, from the public key/secret key table (see FIG. 5B) stored in itself (step S3).

Next, the source router selects the common key for encrypting the data, from the common key table (see FIG. 5C) stored in itself (Step S4). And the sending router encrypts the data (in this embodiment, only the data portion of the IP packet) using the selected common key (step S5).

Then, the source router, using the public key that was selected at the step S3, encrypts the common key used for encrypting the data portion (step S6), and adds the encrypted common key to the data portion of the IP packet. As to which area of the data portion the encrypted common key is to be added has been already decided between the source router and the destination router. For example, the encrypted common key should be added to the head, to the rear of the data portion or the like.

Next, the source router makes alteration of the header portion of the IP packet, resulting from adding the encrypted common key to the data portion (step S8). As to points to be altered, in the case of the IPv4, the header length, overall length, ID and flag of the header portion are altered. Each value of these is changed to the value after the encrypted common key was added.

Then, the source router transmits the IP packet to the destination router through the leased line network 1 (step S9). After that, processing returns to the step S1. If the IP packet transmitted from the source router pass through one or more relay routers (whichever one of the routers 5) until it arrives at the destination router, these relay routers perform routing of the IP packet on the basis of the routing table like the general relay routers on the Internet.

At the step S2, if the data is judged as not being subject to secret concealment (NO at the step S2), processing goes on to the step S9, and the data is sent from the source router "as is", without undergoing encryption process.

Provided that if all data is subject to encryption, processing at the step S2 will be omitted.

Figure 7:
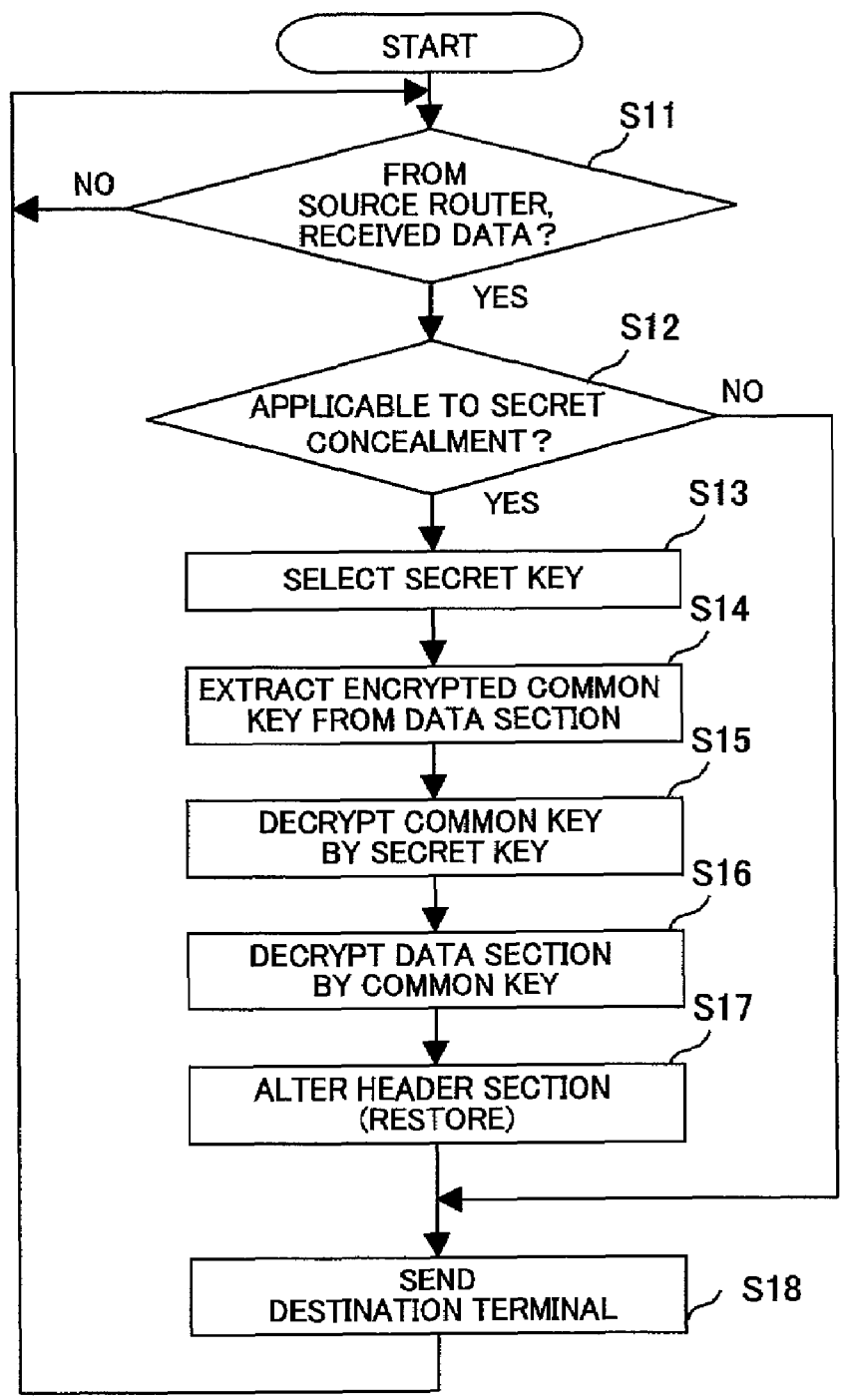
FIG. 7 is a flowchart showing the flow of processing of the source router.

FIG. 7 is a flowchart showing the flow of processing of the source router. When the destination router receives the data (IP packet) from the source router (step S11), the destination router judges whether the received data is subject to secret concealment or not (step S12). This judgment, like the judgment at the step S2 as described above, is made based on the comparison of the source address (IP address) and the destination address (IP address) contained in the header portion of the IP packet, with the secret concealment applicable table (see FIG. 5A) stored in itself.

If the data is judged as being subject to secret concealment (YES at the step S12), the destination router selects its own secret key from the public key/secret key table (see FIG. 5B) stored in itself (step S13).

Next, the destination router extracts the encrypted common key from the data portion of the data (IP packet) (step S14). As described above, because the point to which the encrypted common key was added has been determined in advance between the routers, the destination router extracts the encrypted common key from the pre-determined point.

Then, the destination router decrypts the extracted common key by the secret key selected at the step S13 (step S15). And, the destination router decrypts the data portion by the common key obtained by decryption (step S16). As shown in FIG. 4B, if the specific encryption method is specified corresponding to the common key, the destination router selects the encryption method corresponding to the common key, from the common key table stored in itself, and decrypts the data portion based on the common key and the selected encryption method.

Next, the destination router performs necessary alteration of the header portion of the IP packet (in other words, to return the header portion to its original state before encryption), resulting from the decryption of the data portion and the extraction of the common key from the data portion (step S17).

After that, the destination router sends the restored IP packet to the destination terminal (subscription terminal) directly connected to itself, through the local area network 4 (step S18). After that, processing returns to the step S11.

At the step S12, if the data is judged as not being subject to secret concealment (NO at the step S2), processing goes on to the step S18, and the data is sent to the terminal "as is", without undergoing decryption treatment.

For caution's sake, if all data is subject to decryption, processing at the step S12 will be omitted.

As described above, in this embodiment, as the router 5 decrypts/encrypts the data based on the pre-determined secret concealment terminal table, information (like confidential internal information closed to outsiders) can be effectively protected from any illegal tapping, copying, alteration, etc. by the third party, even if the user of the terminal 6 is not specially conscious of secret concealment.

Next, description will follow about updating processing of the table stored in each router, when the table stored in the management database 20 was updated.

As the central management device 2 and the management database 20 collectively manages the information required for decryption/encryption of the communication network system 10, if any change arises in the information, first of all the information contained in the management database 20 is updated.

The management database 20 must be updated in the following cases; e.g. where the terminal 6 is newly added to a certain local area network system 3; where the existing terminal 6 was removed from a certain local area network system 3; where a new local area network system 3 was added to the communication network system 10; where the existing local area network system 3 was removed from the communication network system 10; or, where any addition, alteration or deletion took place in the public key, secret key or common key.

For example, when a new terminal 6 is added to a certain local area network system 3, the information concerning the newly added terminal is added to the secret concealment applicable table (see FIG. 2). Also, when a new local area network system 3 is added, the information concerning the router 5 and the terminal 6 of the newly added local area network system 3 is added to the secret concealment applicable table, and to the public key/secret key table (see FIG. 3A or 3B), the information (public key and secret key) concerning the router 5 of the newly added local area network system 3 is added. When any change took place in the public key or the secret key, the public key/secret key table is changed, and when any change took place in the common key (or encryption method), the common key table (FIG. 4A or 4B) is changed.

Moreover, in addition to these cases, in order to avoid keeping the management database 20 in the same state for a long period of time and to enhance security, it is preferable to periodically update the database.

The manager of the communication network system 10, or the operator of the central management device 2, operating the central management device 2, will update the management database 20.

Figure 8:
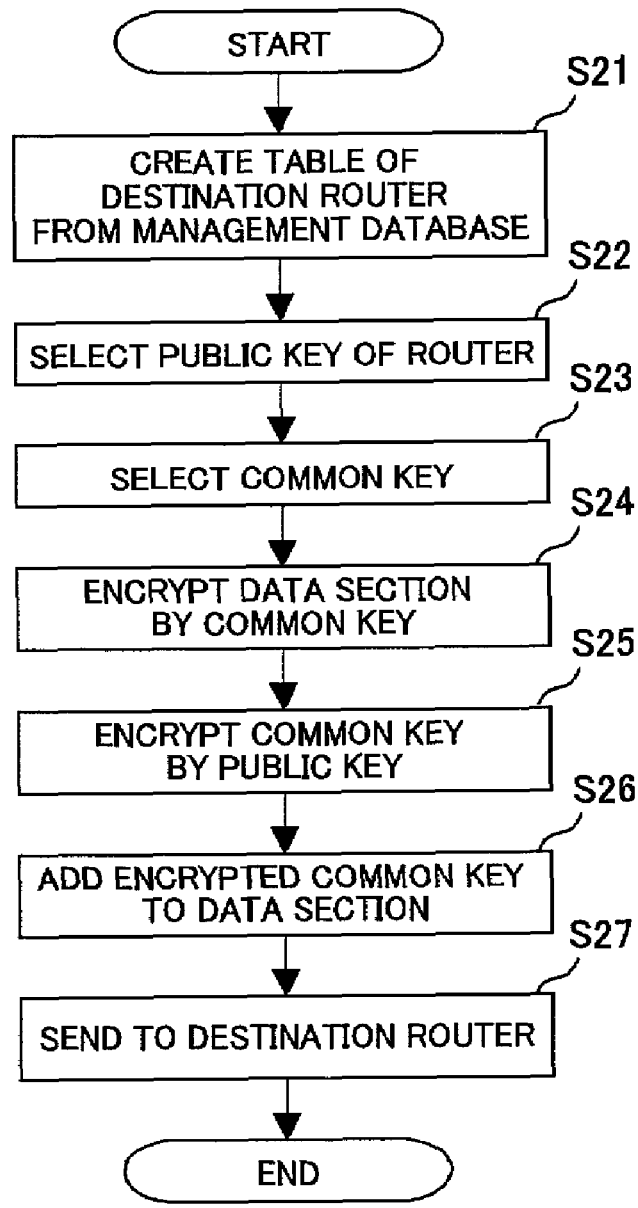
FIG. 8 is a flowchart showing the flow of processing of the central management device, when the secret concealment applicable table of the management database, the public key/secret key table, or the common key table is updated.

When the management database 20 is updated, the updated portion is sent to each router that needs updating, in order to allow each router to reflect the updated management database 20 into the table stored in each router. FIG. 8 is a flowchart showing the flow of processing of the central management device 2, when the secret concealment applicable table of the management database 20, the public key/secret key table, or the common key table is updated.

First of all, the central management device 2 generates a table of a router to which the updated table is to be sent (destination router) (step S21).

Next, the central management device 2 selects the public key of the destination router from the public key/secret key table (step S22). At this time, if the public key/secret key table is already updated, it is preferable that the public key/secret key table, from which the public key is to be selected, would be in the state of before updated (in other words, the public key to be selected is also preferably in the state of before updated). This is because that the destination router, which receives the updated public key/secret key table, receives the updated public key/secret key, and performs decryption using the secret key before updating, until updating of its own data completes. Therefore, the management database 20 is preferably required to temporarily hold the data before updating, until updating of the data stored in each router completes.

Then, the central management device 2 selects the common key of the destination router from the common key table (step S23). At this time, like the public key/secret key table described above, if the common key table is already updated, it is preferable that the common key table, from which the common key is to be selected, would be the table before updated (in other words, the common key to be selected would preferably be the key before updated).

Next, the central management device 2 encrypts the data portion of the IP packet created from the table prepared at the step S21, by the common key selected at the step S23 (step S24). When the prepared table is divided into a plurality of IP packets, the data portion of each IP packet is encrypted using the common key.

Then, the central management device 2 encrypts the common key by the public key selected at the step S22 (step S25).

Next, like processing at the step S7 shown in FIG. 6 as described above, the central management device 2 adds the encrypted common key to the data portion of the IP packet (step S26). With this addition, the added header portion of the IP packet is changed. When the table is to be sent, after being divided into a plurality of IP packets, it is preferable to add the encrypted common key to the head of the IP packets.

Then, the central management device 2 sends the encrypted table and common key to the destination router (step S27).

Figure 9:
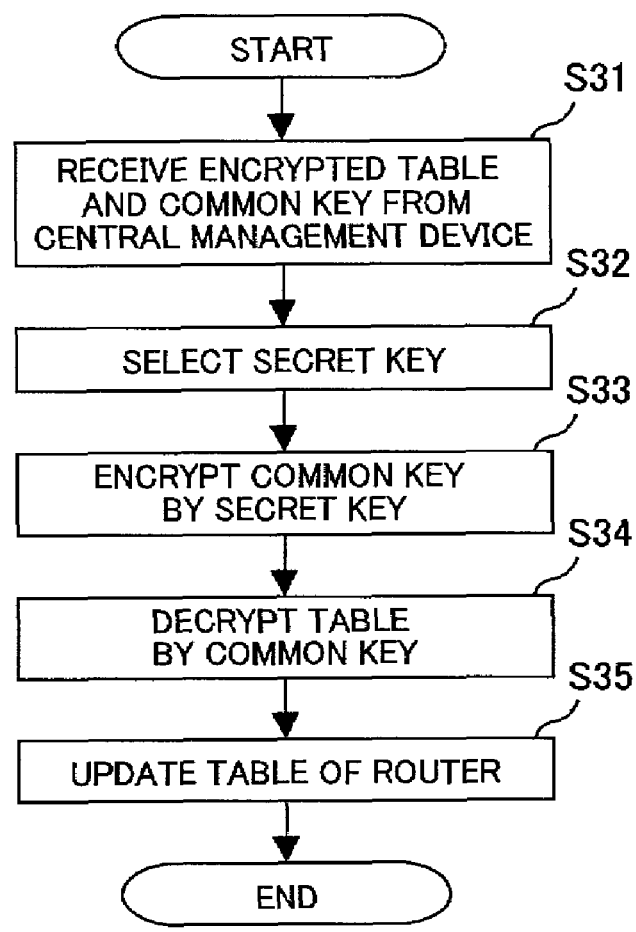
FIG. 9 is a flowchart showing the flow of processing of the destination router, when the updated table is sent from the central management device.

On the other hand, when the updated table is sent, the destination router updates its own stored data by this table. FIG. 9 is a flowchart showing the flow of processing of the destination router, when the updated table is sent from the central management device 2.

Upon receiving the encrypted table and common key from the central management device 2 (step S31), the destination router selects the secret key (step S32), and decrypts the encrypted common key by the selected secret key (step S33). At this time, even if the table sent from the central management device 2 is a public key/secret key table, and this public key/secret key table is updated, the secret key selected at the step S32 is a key already stored in the destination router (in other words, secret key before being updated).

Then, the destination router will decrypt the table by the common key (step S34). If the table is divided into a plurality of IP packets and sent, to re-construct the table, the data portion of each IP packet is decrypted, and a plurality of decrypted data portions is connected.

Next, the destination router will substitute (update) its own stored table, by the decrypted table (step S35). By this, updating of the table of the destination router completes.

As described above, in this embodiment, the central management device 2 and the management database 20 collectively manage the secret concealment table, the public key/secret key table, and the common key table. And if updated, the updated information is sent from the central management device 2 to each of the router 5, so that the data held by each of the router 5 is updated. Therefore, the user of the terminal 6 can be released from troublesome work, like managing the key, judging the necessity of decrypting/encrypting data, etc. Also, if any change took place in the communication network system 10, such change can be dealt with flexibly.

In the embodiments as described before, encryption is usually performed on an IP packet-by-packet basis, however, it is possible to encrypt the entire data in advance, and send the encrypted total data, after dividing it into IP packets. Also, if the destination router already knows the common key used by the source router, it may not be necessary to encrypt this common key by the public key and sent to the destination router.

In addition, processing given in each flowchart shown in FIG. 5 through FIG. 9 could be described by the program to be integrated into the router 5 or the central management device 2, or could be implemented by hardware circuit.

It is to be noted that the second source terminal and the first destination terminal can be the same or different ones. In the same manner, the second destination terminal and the first source terminal can be the same or different ones.

According to the present invention, even if the user of the individual terminal is not specially conscious of secret concealment of the data to be communicated between the local area network systems, the data that needs encryption is sent after being encrypted, and is decrypted at the receiver side and distributed. By this function, the data to be communicated between the local area network systems can be secretly concealed.

Moreover, according to the present invention, the central management device can collectively manage information (common key, public key, secret key, etc.) required for secret concealment of the data to be communicated between the local area network systems. By this feature, each user, router, etc. is not required any more to individually manage information to be secretly concealed, and, the feature also enables the user to flexibly deal with such change, if any, in the communication network system.

What is claimed is:

1. A communication network system having a central management device and a plurality of local area network systems, said central management device and said plurality of local area network systems being connected to each other, each of the plurality of local area network systems having a router and a terminal which are connected to each other via a local area network,
    said central management device comprising:
    a management database for storing at least one common key, each public key assigned to each router and a public key assigned to the central management device; and
    a central-side encryption unit for encrypting the common key by using each public key assigned to each router, and sending the encrypted common key to each router;
    said router comprising:
    a first router-side decryption unit for decrypting the encrypted common key sent from said central-side encryption unit by using a secret key of the router;
    a storage unit for storing the common key after decryption by said first router-side decryption unit;
    a router-side encryption unit for encrypting communication data to be sent from a first source terminal in a local area network system of the router to a first destination terminal in another local area network system, or communication data to be sent from the router to the central management device, by using the common key stored in said storage unit, and sending the encrypted communication data to another local area network or the central management device, wherein
    said central-side encryption unit encrypts the public keys and sends said encrypted public keys to each router,
    said first router-side decryption unit decrypts the encrypted public keys sent from the central-side encryption unit by using the secret key of the router,
    said storage unit stores the public keys after decryption by said first router-side decryption unit, and
    said router-side encryption unit selects the public key for a router of another local area network system or the central management device to be a destination from the public keys stored in the storage unit, encrypts the common key by using the selected public key, and sends the encrypted common key to another local area network or the central management device, together with the encrypted communication data.

2. The communication network system according to claim 1, wherein
    said management database further stores secret concealment terminal data indicating a combination of one terminal in one of the plurality of local area network systems and another terminal in another of the plurality of local area network systems, data communicated between one and another terminals of said combination being required to be encrypted;

said central-side encryption unit encrypts the secret concealment terminal data by using each public key assigned to each router, and sends the encrypted secret concealment terminal data to each router, said first router-side decryption unit decrypts the encrypted secret concealment terminal data sent by the central-side encryption unit by using the secret key of the router, said storage unit stores the secret concealment terminal data after decryption, and said router-side encryption unit encrypts the communication data if the combination of the first source terminal and the first destination terminal is contained in the secret concealment terminal data.

3. The communication network system according to claim 2, wherein if said secret concealment terminal data stored in the management database is updated, said central-side encryption unit encrypts the updated secret concealment terminal data and sends the updated and encrypted secret concealment terminal data, and said first router-side decryption unit decrypts the updated and encrypted secret concealment terminal data, and said storage unit substitutes the already stored secret concealment terminal data by the updated secret concealment terminal data after decryption, for storage.

4. The communication network system according to claim 1, wherein said router further comprises:

a second router-side decryption unit for decrypting data sent from a second source terminal in another local area network system to a second destination terminal in the local area network system of the router, and sending the data after decryption to said second destination terminal.

5. The communication network system according to claim 4, wherein said management database further stores secret concealment terminal data indicating a combination of one terminal in one of the plurality of local area network systems and another terminal in another of the plurality of local area network systems, data communicated between one and another terminals of said combination being required to be encrypted, said central-side encryption unit encrypts said secret concealment terminal data by using each public key assigned to each router, and sends the encrypted secret concealment terminal data to each router, said first router-side decryption unit decrypts the encrypted secret concealment terminal data sent by the central side encryption unit, by using the secret key of the router, said storage unit stores the secret concealment terminal data after decryption, and said second router-side decryption unit decrypts the communication data if the combination of the second source terminal and the second destination terminal is contained in the secret concealment terminal data.

6. The communication network system according to claim 5, wherein if said secret concealment terminal data stored in the management database is updated, said central-side encryption unit encrypts the updated secret concealment terminal data and sends the updated and encrypted secret concealment terminal data, and said first router-side decryption unit decrypts the updated anti encrypted secret concealment terminal data, and said storage unit substitutes the already stored secret concealment terminal data by the updated secret concealment terminal data after decryption, for storage.

7. The communication network system according to claim 1, wherein if the common key stored in the management database is updated, said central-side encryption unit encrypts the updated common key and sends the updated and encrypted common key, and said first router-side decryption unit decrypts the updated and encrypted common key, and said storage unit substitutes the already stored common key by the updated common key after decryption, for storage.

8. The communication network system according to claim 1, wherein if the public key stored in the management database is updated, said central-side encryption twit encrypts the updated public key and sends the updated and encrypted public key, and said first router-side decryption unit decrypts the updated and encrypted public key, and said storage unit substitutes the already stored public key by the updated public key after decryption, for storage.

9. A communication method in a communication network system having a central management device and a plurality of local area network systems, said central management device and said plurality of local area network systems being connected to each other, each of the plurality of local area network systems having a router and a terminal which are connected to each oilier via a local area network, comprising steps of:

in said central management device,
encrypting at least one common key stored in a management database in advance by using each public key assigned to each router, each public key being stored in said management database in advance; and
sending the encrypted common key to each router; and in said router,
decrypting the encrypted common key sent from the central management device by using a secret key of the router;
encrypting communication data to be sent from a source terminal in a local area network system of the router to a destination terminal in another local area network system, or communication data to be sent from the router to the central management device by using the common key; and
sending the encrypted communication data to another local area network or the central management device, and further comprising the steps of:
in said central management device,
encrypting the public keys; and
sending said encrypted public keys to each router, and
in said router,
decrypting the encrypted public keys sent from the central-side encryption unit by using the secret key of the router,
selecting the public key for a router of another local area network system or the central management device to be a destination from the public keys,
encrypting the common key by using the selected public key, and sending the encrypted common key to another local area network of the central management device, together with the encrypted communication data.

10. A router disposed in each of a plurality of local area network systems which are connected to a central management device, the router being connected via a local area network to a terminal disposed in each of the plurality of local area network systems, the router comprising:

a decryption unit for decrypting an encrypted common key sent from said central management device, by using a secret key for said router, said common key being encrypted by using a public key for the router;

a storage unit for storing said common key after decryption by said decryption unit; and an encryption unit for encrypting communication data to be sent from a source terminal in a local area network system of said router to a destination terminal in another local area network system, or communication data to be sent from said router to the central management device, by using the common key stored in said storage unit, and sending the encrypted communication data to another local area network or the central management device, wherein said decryption unit decrypts the encrypted public keys sent from said central management device by using the secret key of the router, said storage unit stores the public keys after decryption by said decryption unit, and said encryption unit selects the public key for a router of another local area network system or the central management device to be a destination from the public keys stored in the storage unit, encrypts the common key by using the selected public key, and sends the encrypted common key to another local area network or the central management device, together with the encrypted communication data.

11. A communication method of a router in each of a plurality of local area network systems which are connected to a central management device, said router being connected to a terminal via a local area network, comprising steps of:

decrypting an encrypted common key sent from said central management device by using a secret key for said router, said common key being encrypted by using a public key for said router;

storing the common key after decryption in a storage unit in the router;

encrypting communication data to be sent from a source terminal in a local area network system of the router to a destination terminal in another local area network system, or communication data to be sent from the router to the central management device, by using the common key stored in the storage unit; and sending the encrypted communication data to another local area network or to the central management device, and further comprising the steps of:

decrypting the encrypted public keys sent from said central management device by using the secret key of the router, storing the public keys after decryption by said decryption unit, selecting the public key for a router of another local area network system of the central management device to be a destination from the public keys stored in the storage unit, encrypting the common key by using the selected public key, and sending the encrypted common key to another local area network or the central management device, together with the encrypted communication data.

12. A program product executed by a router disposed in each of a plurality of local area network systems which are connected to a central management device, the router being connected via a local area network to a terminal disposed in each of the plurality of local area network systems, said program product comprising steps of:

decrypting an encrypted common key sent from the central management device by using a secret key of die router, said common key being encrypted by using a public key of the router;

storing said common key after decryption in a storage unit of the router;

encrypting communication data to be sent from a source terminal in a local area network system of the router to a destination terminal in another local area network system, or communication data to be sent from the router to the central management device, by using the common key stored in the storage unit; and sending the encrypted communication data to another local area network or to the central management device, and further comprising the steps of:

decrypting the encrypted public keys sent from said central management device by using the secret key of the router, storing the public keys after decryption by said decryption unit, selecting the public key for a router of another local area network system of the central management device to be a destination from the public keys stored in the storage unit, encrypting the common key by using the selected public key, and sending the encrypted common key to another local area network or the central management device, together with the encrypted communication data.

13. A central management device connected to a plurality of local area network systems each having a router and a terminal which are connected to each other through a local area network, the central management device comprising:

a management database for storing at least one common key, each public key assigned to each router and a public key assigned to said central management device, said at least one common key being used by each router to encrypt communication data to be communicated between a terminal of a local area network system and a terminal of another local area network system, or between each router and the central management device; and an encryption unit for encrypting the common key by using each public key assigned to each router, and sending the encrypted common key to each router, wherein the encrypted common key by using the public key is transmitted to between the terminal of the local area network system and another local area network system with the encrypted data by using the common key.

14. A management method of a central management device connected to a plurality of local area network systems each having a router and a terminal which are connected to each other through a local area network, the management method comprising steps of:

storing in a management database and managing at least one common key, each public key assigned to each router and a public key assigned to said central management device, said at least one common key being used by each router to encrypt communication data to be communicated between a terminal in a local area network system and a terminal in another local area network system, or between a router and the central management device;

encrypting the common key by using each public key assigned to each router; and sending the encrypted common key to each router, wherein the encrypted common key by using the public key is transmitted to between the terminal of the local area network system and another local area network system with the encrypted data by using the common key.

15. A program product executed by a computer installed in a central management device connected to a plurality of local area network system each having a router and a terminal which are connected to each other through a local area network, said program product comprising steps of:

storing in a management database and managing at least one common key, each public key assigned to each router and a public key assigned to said central management device, said at least one common key being used by each router to encrypt communication data to be communicated between a terminal in a local area network system and a terminal in another local area network system, or between a router and the central management device;

encrypting the common key by using each public key assigned to each router; and sending the encrypted common key to each router, wherein the encrypted common key by using the public key is transmitted to between the terminal of the local area network system and another local area network system with the encrypted data by using the common key.

* * * * *